Nov. 23, 1943.    E. CERRACCHIO    2,334,750
VIEWING DEVICE
Filed Jan. 9, 1942    2 Sheets-Sheet 1
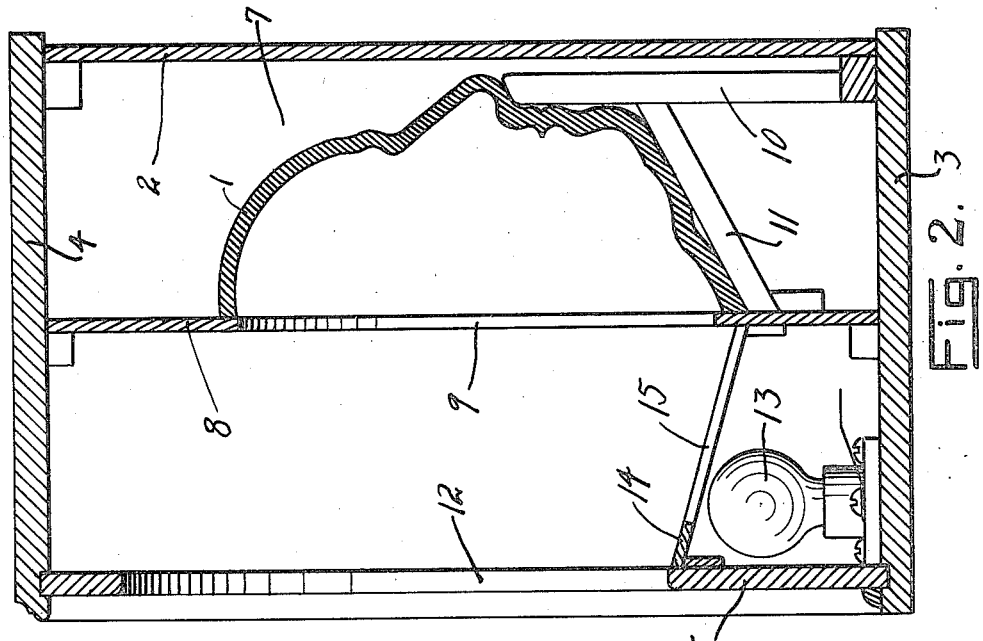
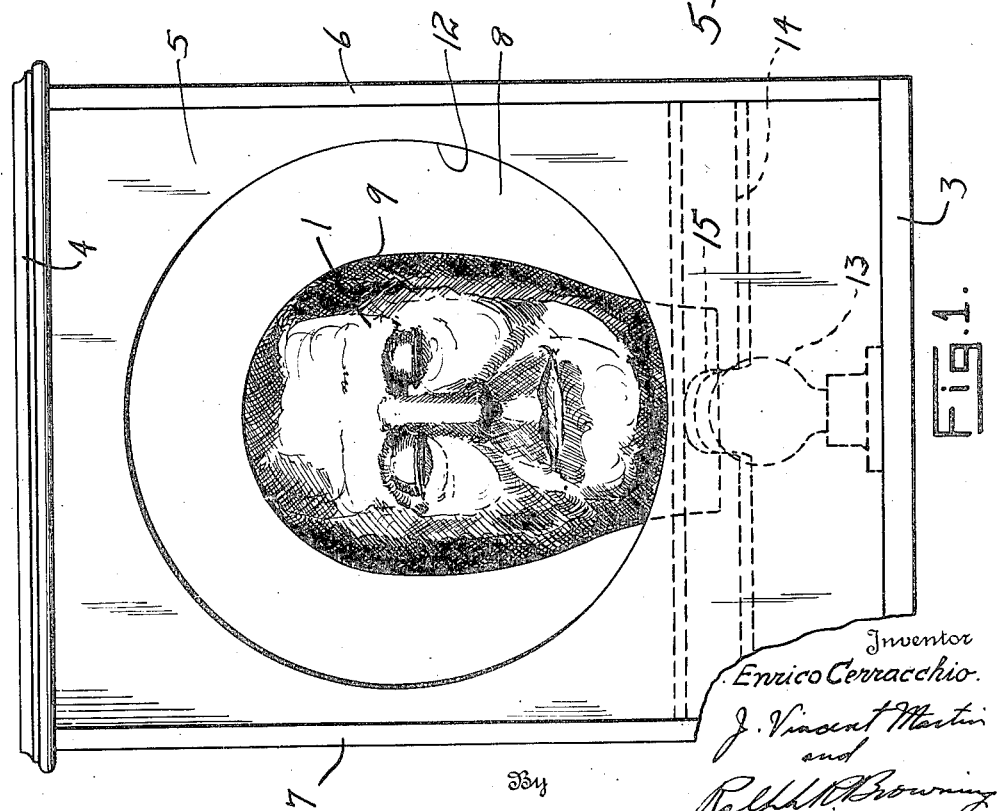
Inventor
Enrico Cerracchio.
By J. Vincent Martin
and Ralph R. Browning
Attorneys Nov. 23, 1943.  E. CERRACCHIO  2,334,750
VIEWING DEVICE
Filed Jan. 9, 1942  2 Sheets-Sheet 2

Inventor
Enrico Cerracchio.

Patented Nov. 23, 1943

2,334,750

UNITED STATES PATENT OFFICE 2,334,750

VIEWING DEVICE

Enrico Cerracchio, Houston, Tex.

Application January 9, 1942, Serial No. 426,171

11 Claims. (Cl. 35—26)

This invention relates to viewing devices and has for its general object the provision of a viewing device which will make it possible to exhibit a mask and specifically a so-called death mask in such a manner that the same will appear positive and lifelike. This invention, of course, has application to the exhibition and viewing of masks of various and sundry types of objects but specifically it is intended for the viewing of and reproduction in lifelike form of a mask of the features of a human face.

There are of course various means now known for reproducing a human countenance, chief among these being sculpture because, with the exception of certain complicated photographic processes, sculpture alone is capable of depicting the human countenance in truly third dimensional form. When a subject poses for a sculptor, his face has fleeting expressions depending on his mood. The sculptor endeavors to interpret these fleeting expressions as he perceives them and the result may or may not be a realistic image of the subject. It is also necessary for the sculptor to observe the subject from various angles by reason of the fact that he is dealing in the third dimension, and in many cases where the sculptor has only a photograph to work from this viewing of the subject from different angles is an impossibility. Furthermore, as the sculptor views first from one angle and then another the mood and appearance of the subject may change so that after the sculptor has viewed the subject from one angle and then moved to another angle he may get a different view, not of the subject having the same appearance, but of the subject having a different appearance because of his different mood.

The making of a so-called death mask is of course a very old expedient for the purpose of obtaining an accurate reproduction of a human countenance. However, the use of such death masks in the past has been principally to serve as a mold so that from the negative death mask a positive reproduction of the person's countenance could be obtained by filling the death mask with some plastic material such as plaster of Paris and then removing the mask. Such a procedure, however, merely reproduces the person's countenance in positive form in a manner which may appear substantially the same as a piece of statuary. The mask as such has not been particularly useful because of the fact that although under certain conditions it has been observed that the mask viewed from its negative side takes on a positive appearance, the features depicted in the mask have at all times been observed as distorted and unrealistic, giving to the image observed a rather hideous and fantastic appearance so that such image has been utterly useless in itself as an illustration of the appearance of the subject from which the mask was taken.

A more specific object of this invention therefore is to make it possible to view a death mask negative directly and to obtain upon such viewing the impression of a positive image without distortion of the features and with a very natural appearance.

Another object of this invention is to produce a means for so viewing a death mask or the like which will give to the image as viewed by an observer an extremely lifelike appearance.

Another object of this invention is to produce such a device which will make it possible to view a death mask and obtain therefrom an impression of an actual living object capable of motion and to cause an illusion capable of producing the effect of an actual movement of the image.

It has been discovered that by means of proper illumination and proper mounting a death mask can be made to produce an image which is not distorted or fantastic such as a death mask viewed without such proper illumination and mounting but which is on the contrary very natural as well as positive in its appearance and which also exhibits most remarkable lifelike appearance.

Other objects and advantages than those above stated will become apparent from the following description taken in connection with the accompanying drawings wherein is set forth by way of example one embodiment of the invention.

In the drawings:

Fig. 1 shows a front view of a cabinet having a death mask properly mounted and illuminated therein in accordance with the present invention and illustrating the view which an observer would see.

Fig. 2 is a central vertical cross section through the device illustrated in Fig. 1 taken at right angles to Fig. 1.

Figure 4:
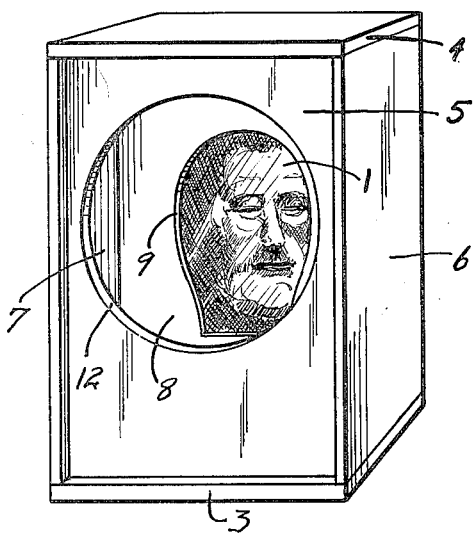
Fig. 4 is a perspective view of the device illustrated in Fig. 1 illustrating the result of viewing such device and the death mask therein from an extreme right-hand position, such as A in Fig. 3.
Figure 5:
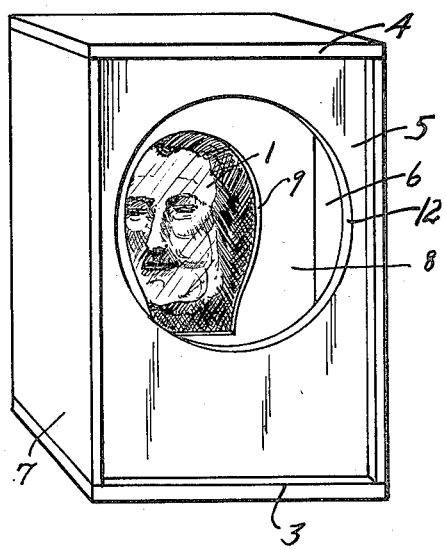
Fig. 5 is a view similar to Fig. 4 but taken from an extreme left-hand position, such as B in Fig. 3.
Figure 3:
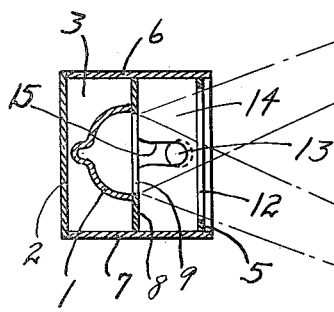
Fig. 3 shows on a reduced scale a horizontal cross section through the same device and illustrates diagrammatically the effect of viewing the device from various angles.

Referring now more particularly to the drawings, a death mask 1, displaying the entire face from ear to ear, is illustrated as mounted within a housing or cabinet having a rear wall 2, a bottom 3 and a top 4, a front wall 5, and side walls 6 and 7.

The death mask is mounted against the rear surface of a partition 8 which extends transversely within the cabinet and takes up the entire space between the top and bottom and the two sides thereof. This partition 8, however, has an opening 9 therein which is of substantially the same size as the opening into the interior of the negative side of the death mask, so that this interior of the death mask may be viewed through the opening 9.

At this point let it be stated that that portion of the death mask which bears the negative impression of the face on which it was formed, that is the surface of the mask which was in contact with the face of the subject, will be referred to as the negative side of the death mask in this specification and in the accompanying claims. The negative side of a death mask is the hollow or concave side as contrasted to the convex character of a positive, such as may be prepared by using a negative as a mold for a casting.

The mask is supported in any suitable manner against the partition 8 such as by means of appropriate supports 10 and 11 arranged within the cabinet.

The front wall 5 of the cabinet is also provided with an opening 12 therethrough, this opening being of such size and disposition that the negative or interior of the mask 1 may be viewed from a substantial variety of different angles by an observer standing at a distance in front of the cabinet.

Within the cabinet and in front of the partition 8 and between this partition and the front wall 5 there is provided a suitable source of illumination such as the electric light 13. This light 13 as illustrated is located below the lower edge of the opening 12 in the front wall 5 and is below and in front of the mask so that the rays of light from the bulb 13 will be directed upwardly toward the interior of the mask. It is appreciated that the rays of light will radiate from this source of illumination in substantially all directions and that it will not strike the interior of the mask 1 at the same angle at all points. However, it is so situated that it will strike the interior of the mask at an angle of substantially 45° to the vertical at a point which is substantially midway of the entire height of the mask. This electric bulb is preferably located identically in the center with respect to the width of the mask, that is, it is located in a plane which would form the perpendicular bisector of the mask.

While the actual distances and relative positions of the mask and lamp will not be the same for all cases, the general relationship will hold good and it is noted by way of example that in the case of one mask the lamp was located at a position about seven and one-half inches in front of the partition 8 and that was in that case about twelve inches in front of the point of the nose of the mask. In the same instance the lamp was located approximately three inches below the point of the chin of the mask. The mask itself is preferably mounted so that it will be tilted slightly toward the rear of the cabinet, that is its uppermost part will be closer to the rear panel of the cabinet than it would normally be if it were occupying a vertical position. This tilting, however, is optional and may be accomplished in any one of a number of ways such as by tilting the mask without tilting the partition 8 or by tilting the two as a unit.

Disposed over the electric lamp 13 is a shield 14 which has an opening 15 therein directly over the bulb 13 so as to permit the light from this bulb to pass through and strike against the interior of the mask. This shield 14 however will serve to prevent the rays of the lamp 13 from being widely dispersed within the cabinet thereby to distract and detract from the attention of the observer to the mask itself.

The result of arranging and illuminating a mask in the manner just described is a startling transformation of the mask itself. In the first place, an observer standing at a little distance from the device and looking upon the mask through the openings 12 and 9 will see what appears to be a positive instead of a negative image of the features of the person from whom the mask was taken. This image like the mask will be possessed of all of the individual characteristics of the face from which it was taken and this is true as to the features of the sides of the face as well as those directly from the front.

In addition to the result just noted, the peculiar manner of illuminating the mask has the very startling effect of producing a positive image that appears to be illuminated from an overhead point and gives much the same effect as the light from the skylight shining at approximately 45° upon a person's face. This is considered one of the most favorable lighting conditions under which a sculptor can work. That is, it is one of the most favorable lighting conditions for viewing a person's face in order to obtain a true sense of proportion and a minimum of distortion.

The perfect and natural appearing positive image which is thus provided by this invention has one other characteristic which tends greatly to increase its lifelikeness and in certain respects to make it appear to be actually alive. That is, this natural appearing image will when the observer walks say toward the right-hand direction as he views the image appears to rotate so that the observer will see more and more of the right-hand side of the face of the image. That is, the image will appear to rotate faster than the observer is moving and in the same direction whichever way the observer may move. This naturally lends a very lifelike appearance to the image and adds greatly to its already natural appearance.

It will be appreciated of course that the cabinet taken as a whole serves as a shield for keeping extraneous light rays from striking the mask, and that the front portion of the cabinet below the opening and directly in front of the lamp 13 serves as a shield to prevent the rays of this lamp from being seen directly by the observer. The lamp thus constitutes the major if not the sole means of illuminating the mask, depending upon whether any substantial amount of light is permitted to enter the cabinet through the opening 12. For best conditions the amount of such light entering through the opening 12 or by any other means other than that which comes from the lamp 13 will be reduced to a minimum.

From the foregoing it will be seen that a means has been provided whereby a death mask may be made to reproduce through proper illumination and illusory effects an almost living reproduction of the object from which the mask was taken. This reproduction may be used by a sculptor to reproduce the object, but probably its greater value would be in perpetuating in a very lifelike form the images of persons no longer living. Thus, this device would serve the same purpose as statutory in preserving the images of persons after they have passed on, but it would serve that purpose in certain respects to a far greater extent than the usual statuary because the image would in fact be produced in a form in which it would appear to be alive rather than a dead object.

A device has therefore been produced which is capable of accomplishing and carrying out all the objects sought by this invention.

Having described my invention, I claim:

1. A mask viewing device comprising means for supporting the mask with its negative side exposed to the view of an observer, a single light source below and on the negative side of said mask in position to illustrate the same, and means for shielding said light source from the observer, whereby to the observer the mask appears to be displayed as a positive.

2. A mask viewing device comprising means for supporting a mask with its negative side exposed to the view of an observer, a single light source below and on the negative side of said mask in position to illustrate the same, a shield for shielding said mask against extraneous light rays, and means for shielding said light source from the observer, whereby to the observer the mask appears to be displayed as a positive.

3. A mask viewing device comprising means for supporting a mask with its negative side exposed to the view of an observer, a single light source below and on the negative side of said mask in position to illuminate the same and located on a line drawn through the center of said mask and substantially at right angles to the mask, means for shielding said light source from the observer, and means for shielding the negative side of said mask from extraneous light rays, whereby to the observer the mask appears to be displayed as a positive.

4. In an organization of the character described, a mask, means for supporting the mask with its negative side exposed to the view of an observer, means for shielding the negative side of said mask from undesired extraneous light rays, a source of light below and on the negative side of said mask to cast a light from below into the negative portion of said mask to illuminate the same, and means for shielding said light source from an observer looking at said negative portion of the mask from beyond the light source, whereby to the observer the mask appears to be displayed as a positive.

5. A mask viewing device comprising means for supporting a mask with its negative side exposed to the view of an observer, a single light source below and on the negative side of said mask to illuminate the same and located so that rays from said light source will fall upon the center of said mask substantially at an angle of 45° with respect to the vertical, and means for shielding said light source from the observer, whereby to the observer the mask appears to be displayed as a positive.

6. In an organization of the character described, a mask, means for supporting the mask with its negative side exposed to the view of an observer, means for shielding the negative side of said mask from undesired extraneous light rays, a source of light below and on the negative side of said mask to illuminate the same and located on a line drawn through the center of said mask and at substantially right angles to the mask to cast the light from below into the negative portion of said mask so that it will fall upon the central portion of said mask at an angle of approximately 45° with respect to the vertical, and means for shielding said light source from the observer looking at said negative portion of the mask from beyond the light source, whereby to the observer the mask appears to be displayed as a positive.

7. In an organization of the character described, a mask, means for supporting the mask with its negative side exposed to the view of an observer, a source of light below and on the negative side of said mask to cast light from below into the negative portion of said mask to illuminate the same, and means for shielding said light source from an observer looking at said negative portion of the mask from beyond the light source, whereby to the observer the mask appears to be displayed as a positive.

8. In an organization of the character described, a mask taken from a human face, means for supporting the mask with its negative side exposed to the view of an observer, a source of light below and on the negative side of said mask to illuminate the same and located approximately twelve inches back from the point of the nose of the mask and approximately three inches below the point of the chin thereof, and means for shielding said light source from an observer looking at said negative portion of the mask from beyond the light source, whereby to the observer the mask appears to be displayed as a positive.

9. In a viewing device, a housing having a sight opening in one wall thereof, a mask so mounted that the negative side is visible to an observer looking through said sight opening, means for supporting said mask, and a light source below the position of a mask so held and spaced therefrom in a direction toward said opening to cast a light into the negative portion of such mask at an angle of approximately 45° from below, whereby the negative side of the mask appears to the observer as the positive side.

10. In a viewing device, a housing having a sight opening in one wall thereof, a mask so mounted that the negative side is visible to an observer looking through said sight opening, means for supporting said mask, and a light source below the position of a mask so held and spaced therefrom in a direction toward said opening to cast a light into the negative portion of such mask from below, whereby the negative side of the mask appears to the observer as the positive side.

11. In a viewing device, a housing having a sight opening in one wall thereof, a mask so mounted that the negative side is visible to an observer looking through said sight opening, means for supporting said mask, and a light source below said opening and the position of a mask so held and spaced therefrom in a direction toward said opening to cast a light into the negative portion of such mask from below, whereby the negative side of the mask appears to the observer as the positive side.

ENRICO CERRACCHIO.